No. 821,659. PATENTED MAY 29, 1906.
C. W. LURTEY.
COMBINED SCISSORS AND PLIERS.
APPLICATION FILED SEPT. 19, 1905.

Witnesses
Milton Lenoir
Sarah V. Lockwood

Charles W. Lurtey, Inventor by Geo. N. Hawkins
his Attorney

UNITED STATES PATENT OFFICE.

CHARLES W. LURTEY, OF LITTLE ROCK, ARKANSAS.

COMBINED SCISSORS AND PLIERS.

No. 821,659.      Specification of Letters Patent.      Patented May 29, 1906.

Application filed September 19, 1905. Serial No. 279,086.

*To all whom it may concern:*

Be it known that I, CHARLES W. LURTEY, a citizen of the United States, residing at Little Rock, county of Pulaski, and State of Arkansas, have invented certain new and useful Improvements in Combined Scissors or Shears and Pliers, of which the following is a specification.

This invention relates to combined scissors or shears and pliers, and has for its object the provision, in connection with shears or pliers, of novel plier-jaws projecting freely outwardly from and beyond the scissors or shears handles in an opposite direction to the blades of the scissors or shears, whereby there is provided in one device two useful tools, one of which is adapted to supplement the work of the other, particularly when the shears or scissors are used in metal cutting and bending operations.

The invention is hereinafter fully set forth and claimed.

Figure 1:
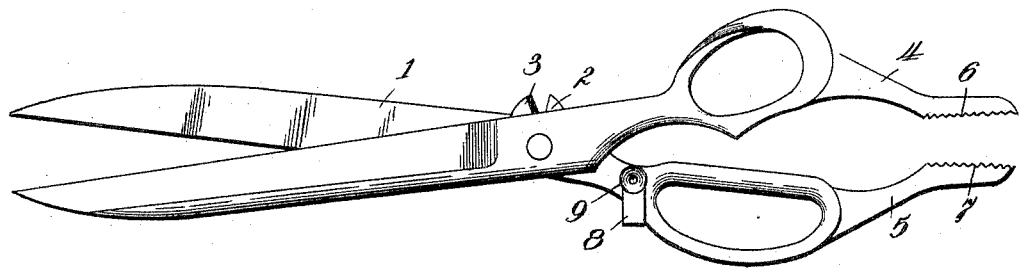
Figure 2:
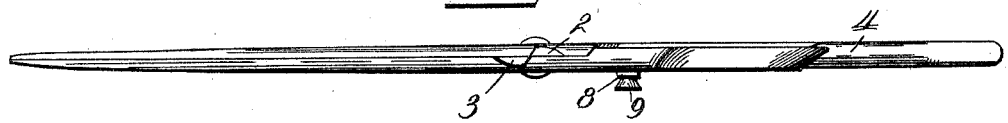

In the accompanying drawings, Figure 1 is a view of the complete invention, and Fig. 2 an edge view.

The scissors or shears are shown at 1, the respective blades being provided with beveled wire-cutting integral jaws 2 and 3, while formed integral with the respective handles of the shears are the plier members 4 and 5, having the jaws 6 and 7 provided with serrations or teeth and adapted to close together when the scissors-blades are closed.

Formed integral with one of the handles is the hollow needle-holder 8 of the needle-threader, said holder being surmounted with a conical or funnel-shaped guide 9 for the thread.

The plier members 4 and 5 have curved or cut-out inner faces to provide a relatively large opening to receive the head or an enlarged part of any object which may be grasped by the jaws 6 and 7, and said members project freely and relatively far beyond the scissors or shears handles in an opposite direction to the scissors or shears blades 1, which enables the user to exert a strong leverage in using the pliers, as also to more readily grasp the object being manipulated, this latter function being also possible on account of the peculiar conformation of the members 4 and 5. If shears are to be used as sheet-metal-cutting shears, the user has at hand a wire-cutting device and also pliers which may be used in manipulating the material.

Having thus described my invention, what I claim as new, and desire to secure by Letters Patent, is—

1. Scissors or shears provided with relatively long plier members secured to the outermost ends of the scissors or shears handles and projecting freely outwardly from and beyond said handles in an opposite direction to said scissors or shears blades and having gripping-jaws on their outer adjacent faces.

2. Scissors or shears provided with relatively long plier members secured to the outermost ends of the scissors or shears handles and projecting freely outwardly from and beyond said handles in an opposite direction to the scissors or shears blades, said plier members being cut out or recessed on their adjacent faces for a portion of their length outwardly from the handles aforesaid and provided with gripping-jaws beyond said cut-out portions.

In testimony whereof I hereunto affix my signature in presence of two witnesses.

CHARLES W. LURTEY.

Witnesses:
    W. F. BOOXE,
    W. B. KENNEY.